United States Patent
Tsien et al.

(10) Patent No.: US 10,656,696 B1
(45) Date of Patent: May 19, 2020

(54) REDUCING CHIPLET WAKEUP LATENCY

(71) Applicants: Advanced Micro Devices, Inc., Santa Clara, CA (US); ATI Technologies ULC, Markham (CA)

(72) Inventors: Benjamin Tsien, Fremont, CA (US); Michael J. Tresidder, Spicewood, TX (US); Ivan Yanfeng Wang, Richmond Hill (CA); Kevin M. Lepak, Austin, TX (US); Ann Ling, Folsom, CA (US); Richard M. Born, Fort Collins, CA (US); John P. Petry, San Diego, CA (US); Bryan P. Broussard, Austin, TX (US); Eric Christopher Morton, Austin, TX (US)

(73) Assignees: Advanced Micro Devices, Inc., Santa Clara, CA (US); ATI Technologies ULC, Markham (CA)

( * ) Notice: Subject to any disclaimer, the term of this patent is extended or adjusted under 35 U.S.C. 154(b) by 150 days.

(21) Appl. No.: 15/907,719

(22) Filed: Feb. 28, 2018

(51) Int. Cl.
*G06F 1/32* (2019.01)
*G06F 1/3206* (2019.01)
*G06F 1/3287* (2019.01)
*G06F 1/3234* (2019.01)

(52) U.S. Cl.
CPC .......... *G06F 1/3206* (2013.01); *G06F 1/3253* (2013.01); *G06F 1/3287* (2013.01)

(58) Field of Classification Search
CPC ..... G06F 1/3206; G06F 1/3253; G06F 1/3287
See application file for complete search history.

(56) References Cited

U.S. PATENT DOCUMENTS

| | | | |
|---|---|---|---|
| 8,090,967 B2 * | 1/2012 | Hallnor | G06F 1/3203 713/323 |
| 8,448,001 B1 * | 5/2013 | Zhu | G06F 1/3206 713/322 |
| 9,535,875 B2 * | 1/2017 | Wilson | G06F 15/17362 |
| 9,612,652 B2 * | 4/2017 | Rosenzweig | G06F 1/3296 |
| 9,971,700 B2 | 5/2018 | Loh | |
| 9,983,652 B2 | 5/2018 | Piga et al. | |
| 2006/0171329 A1 | 8/2006 | Ying | |
| 2008/0126750 A1 | 5/2008 | Sistla | |
| 2011/0119526 A1 | 5/2011 | Blumrich et al. | |
| 2011/0219208 A1 | 9/2011 | Asaad et al. | |

(Continued)

*Primary Examiner* — Stefan Stoynov
(74) *Attorney, Agent, or Firm* — Kowert Hood Munyon Rankin and Goetzel PC; Rory D. Rankin

(57) ABSTRACT

Systems, apparatuses, and methods for reducing chiplet interrupt latency are disclosed. A system includes one or more processing nodes, one or more memory devices, a communication fabric coupled to the processing unit(s) and memory device(s) via link interfaces, and a power management unit. The power management unit manages the power states of the various components and the link interfaces of the system. If the power management unit detects a request to wake up a given component, and the link interface to the given component is powered down, then the power management unit sends an out-of-band signal to wake up the given component in parallel with powering up the link interface. Also, when multiple link interfaces need to be powered up, the power management unit powers up the multiple link interfaces in an order which complies with voltage regulator load-step requirements while minimizing the latency of pending operations.

17 Claims, 6 Drawing Sheets

(56) References Cited

U.S. PATENT DOCUMENTS

2014/0192583 A1 7/2014 Rajan et al.
2015/0120978 A1 4/2015 Kalyanasundharam et al.
2019/0108861 A1 4/2019 Tsien et al.

* cited by examiner

US 10,656,696 B1

REDUCING CHIPLET WAKEUP LATENCY

BACKGROUND

Description of the Related Art

Computing systems are increasingly integrating large numbers of different types of components on multi-chip modules. The complexity and power consumption of a system increases with the number of different types of components. Power management is an important aspect of the design and operation of integrated circuits, especially those circuits that are integrated within mobile devices. Mobile devices typically rely on battery power, and reducing power consumption in the integrated circuits can increase the life of the battery as well as decrease the heat generated by the integrated circuits. To achieve reduced power consumption, various components within an integrated circuit can go into a reduced power state (e.g., a power-gating state).

On a monolithic semiconductor die, an exit from a reduced power state can start once the interrupt controller determines the processor core that will handle the interrupt. However, for a chiplet configuration with multiple semiconductor dies in a package, the links between chiplets can also be powered down, adding to the overall latency of exiting from the reduced power state. Accordingly, improved techniques for reducing chiplet interrupt latency are desired. As used herein, a "chiplet" refers to a processing node which is contained within a single semiconductor die. Also, as used herein, a "chiplet configuration" refers to a system with multiple semiconductor dies connected by link interfaces to a communication fabric on a separate semiconductor die. It is noted that a "semiconductor die" can also be referred to as a "die" herein.

BRIEF DESCRIPTION OF THE DRAWINGS

The advantages of the methods and mechanisms described herein may be better understood by referring to the following description in conjunction with the accompanying drawings, in which.

DETAILED DESCRIPTION OF EMBODIMENTS

Figure 1:
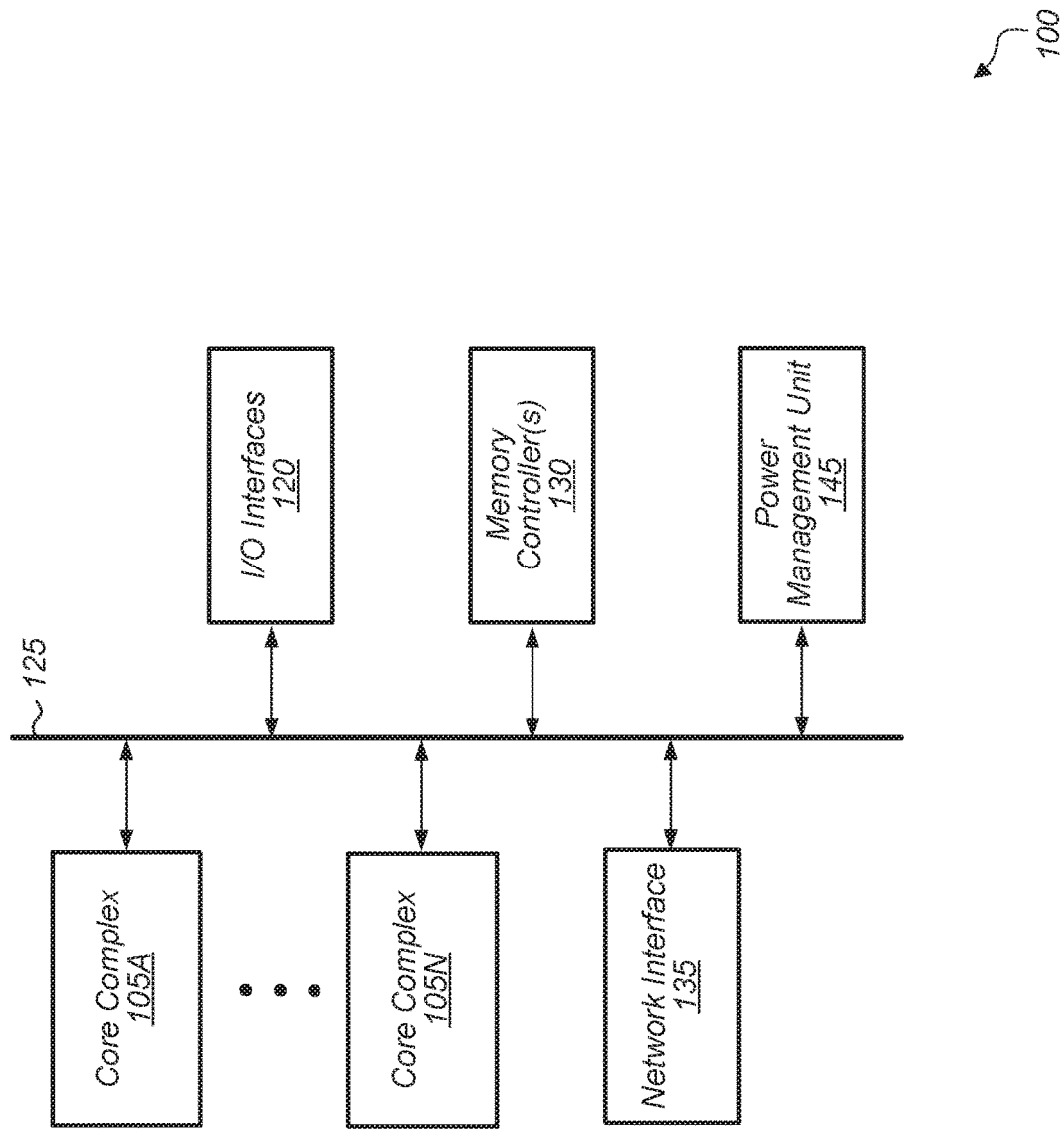
FIG. 1 is a block diagram of one embodiment of a computing system.

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Various systems, apparatuses, methods, and computer-readable mediums for reducing chiplet interrupt latency are disclosed herein. In one embodiment, a system includes at least one or more processing nodes, one or more input/output (I/O) interfaces, a communication fabric, a power management unit, and one or more memory devices. In one embodiment, each of the one or more processing nodes is on a separate semiconductor die from the communication fabric. In this embodiment, there is a link interface between the separate dies, and each die has an interface physical layer (PHY) unit to communicate over the link interface. However, in another embodiment, one or more nodes can be on the same semiconductor die with the fabric and the link interface(s) can connect the node(s) to the fabric on the same die.

In one embodiment, the power management unit manages the power states of the various components of the system. When a given component is idle or relatively inactive, the power management unit can put the given component into a reduced power state. The power management unit turns off a given link interface between dies to conserve power when the processing nodes on either side of the given link interface are in a reduced power state.

If an interrupt targeting a given component (e.g., processor core) is received, and both the given component and the link interface to the given component are in reduced power states, then the power management unit uses an out-of-band signal to wake up the given component while at the same time causing the link interface to the given component to be powered up. In one embodiment, the out-of-band signal is sent over one or more wires of the link interface which are not being used while the link interface is in a reduced power state. The out-of-band signal can be sent while the link interface is being brought up. For example, while a phase-locked loop (PLL) of the link interface is being initialized and before the PLL is locked, the data wires of the link interface will be idle. Accordingly, the out-of-band signal can be sent as a low-data-rate message on one or more of the data wires. This low-data-rate message will be detected by a receiver on or coupled to the given component, with the receiver connected to an always-on power rail. The receiver will decode the message and determine which component is being woken up. Then, the receiver will convey a signal to cause the targeted component to wake-up.

While the targeted component is being awakened, the link interface to the targeted component will be initialized and trained so as to put the link interface in an operational state. This allows the two events which normally are performed in a serial fashion to be performed in parallel to reduce the wake-up latency associated with the targeted component. For example, in one embodiment, the targeted component is a processor core, and the processor core retrieves the stored state from memory after being woken up. The processor core retrieves the stored state from memory over the link interface, and so when the link interface becomes operational, the processor core is able to retrieve the stored state from memory.

In one embodiment, the power management unit determines a preferred order in which to wake up multiple components and multiple link interfaces so as to minimize the wake-up latency of the various components while also complying with voltage regulator load-step requirements. For example, if a condition for waking up multiple components and/or link interfaces is detected, the power management unit might be prevented from waking up all of the components in parallel due to voltage regulator load-step requirements. In this scenario, the power management unit determines which link interfaces to power up first so as to reduce the overall latency of pending operations on the components being woken up. For example, the power management unit first powers up a link interface to a core which is being woken up to service an interrupt. Then, the power management unit powers up link interfaces to cores that will service probes or memory requests from the waking core. In cases where parallel power up is limited by a platform power delivery limit, such as a voltage regulator load-step, the power management unit powers up critical links first followed by non-critical links. Critical links are links used for waking up a core servicing an interrupt or for requests generated by the core as a part of the waking process (e.g., state restore from DRAM, SRAM, NVRAM, etc.). Non-critical links are links to memory, processing, or other fabric nodes used to service requests or probes generated by the waking core or other unrelated DMA traffic.

Referring now to FIG. 1, a block diagram of one embodiment of a computing system 100 is shown. In one embodiment, computing system 100 includes at least core complexes 105A-N, input/output (I/O) interfaces 120, bus 125, memory controller(s) 130, network interface 135, and power management unit 145. In other embodiments, computing system 100 can include other components and/or computing system 100 can be arranged differently. In one embodiment, each core complex 105A-N includes one or more general purpose processors, such as central processing units (CPUs). It is noted that a "core complex" can also be referred to as a "processing node" or a "CPU" herein. In some embodiments, one or more core complexes 105A-N can include a data parallel processor with a highly parallel architecture. Examples of data parallel processors include graphics processing units (GPUs), digital signal processors (DSPs), and so forth. In one embodiment, each processor core within core complex 105A-N includes a cache subsystem with one or more levels of caches.

Memory controller(s) 130 are representative of any number and type of memory controllers accessible by core complexes 105A-N. Memory controller(s) 130 are coupled to any number and type of memory devices (not shown). For example, the type of memory in memory device(s) coupled to memory controller(s) 130 can include Dynamic Random Access Memory (DRAM), Static Random Access Memory (SRAM), NAND Flash memory, NOR flash memory, Ferroelectric Random Access Memory (FeRAM), or others. I/O interfaces 120 are representative of any number and type of I/O interfaces (e.g., peripheral component interconnect (PCI) bus, PCI-Extended (PCI-X), PCIE (PCI Express) bus, gigabit Ethernet (GBE) bus, universal serial bus (USB)). Various types of peripheral devices can be coupled to I/O interfaces 120. Such peripheral devices include (but are not limited to) displays, keyboards, mice, printers, scanners, joysticks or other types of game controllers, media recording devices, external storage devices, network interface cards, and so forth. Power management unit 145 manages the power consumption of the various components of system 100 by changing the power states of these components. For example, when a component has been idle for a threshold amount of time, power management unit 145 can put the component into a power-gated mode to reduce the power consumption of system 100. In various embodiments, power management unit 145 uses various techniques to reduce core wakeup latency over inter-die fabric interface links. These techniques will be described in further detail below.

In various embodiments, computing system 100 can be a server, computer, laptop, mobile device, game console, streaming device, wearable device, or any of various other types of computing systems or devices. It is noted that the number of components of computing system 100 can vary from embodiment to embodiment. For example, there can be more or fewer of each component than the number shown in FIG. 1. It is also noted that computing system 100 can include other components not shown in FIG. 1. Additionally, in other embodiments, computing system 100 can be structured in other ways than shown in FIG. 1.

Figure 2:
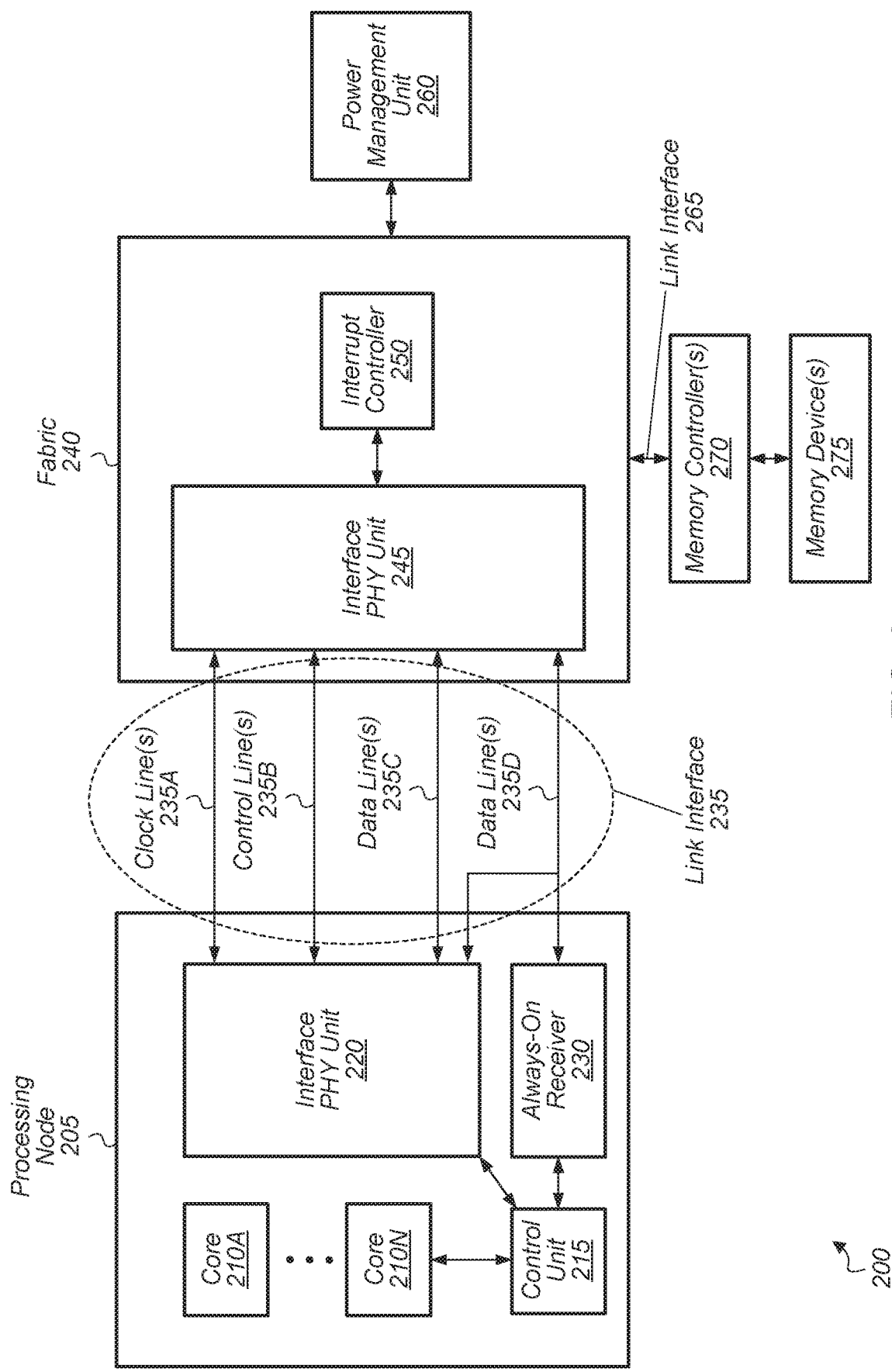
FIG. 2 is a block diagram of another embodiment of a computing system.

Turning now to FIG. 2, a block diagram of another embodiment of a computing system 200 is shown. In one embodiment, computing system 200 includes at least processing node 205, fabric 240, power management unit 260, memory controller(s) 270, and memory device(s) 275. It is noted that computing system 200 can also include other components (e.g., I/O interfaces, I/O devices) which are not shown to avoid obscuring the figure. Also, in another embodiment, computing system 200 can include other numbers of processing nodes in addition to processing node 205.

In one embodiment, processing node 205 and fabric 240 are on separate dies, and link interface 235 provides the connection between these dies. In other words, processing node 205 is on a first die, fabric 240 is on a second die, and the first and second dies are separate and distinct from each other. In one embodiment, processing node 205 is coupled to fabric 240 via link interface 235, with link interface 235 including clock line(s) 235A, control line(s) 235B, and data lines 235C-D. In one embodiment, data line(s) 235D are coupled to always-on receiver 230, and are used for sending out-of-band signals to wake up one or more cores 210A-N while link interface 235 is in a non-operational state. In one embodiment, when link interface 235 is in a non-operational state, lines 235A-235C are in a reduced power state such that they are not capable of transmitting signals/data. However, data line(s) 235D which is coupled to always-on receiver 230 is sufficiently powered to convey signals/data. When link interface 235 is in an operational state, all lines 235 are sufficiently powered to transmit signals/data.

Processing node 205 includes cores 210A-N which are representative of any number and type of processor cores. Processing node 205 also includes control unit 215, interface physical layer (PHY) unit 220, and always-on receiver 230. It is noted that processing node 205 can also include other components which are not shown to avoid obscuring the figure. Interface PHY unit 220 manages link interface 235 and processes data sent to and from fabric 240.

Fabric 240 is representative of any type of communication fabric, bus, and/or other control and interface logic. Fabric 240 is representative of any communication interconnect and any protocol can be used for communicating among the components of the system 200. Fabric 240 provides the data paths, switches, routers, and other logic that connect processing node 205, power management unit 260, memory controller(s) 270, and other components to each other. Fabric 240 handles the request, response, and data traffic, as well as probe traffic to facilitate coherency. Fabric 240 also handles interrupt request routing and configuration access paths to the various components of system 200. Additionally, fabric 240 handles configuration requests, responses, and configuration data traffic. Fabric 240 can be bus-based, including shared bus configurations, crossbar configurations, and hierarchical buses with bridges. Fabric 240 can also be packet-based, and can be hierarchical with bridges, crossbar, point-to-point, or other interconnects.

In one embodiment, power management unit 260 manages the power states of the different components of system 200. In order to conserve power, power management unit 260 can power-gate components during idle times or during periods of relative inactivity. As used herein, the term "power-gate" is defined as reducing the power consumption of one or more components. The term "power-gate" can also be defined as putting a component into a low power state. A "low power state" as defined herein can be a state in which a voltage supplied to the component is reduced from its maximum, a state in which the frequency of the clock signal is reduced from its maximum, a state in which the clock signal is inhibited from the component (clock-gated), one in which power is removed from the component, or a combination of any of the former. To bring a given component out of power-gated mode, power management unit 260 can increase or turn on the supply voltage(s) and/or clock(s) being supplied to the given component. Power management unit 260 can receive control signals from one or more other units, such as a timer, interrupt controller 250, processing unit, and the like, for determining when to transition between different power states for the various components.

At various times during the operation of system 200, power management unit 260 can transition various processor cores 210A-N into a reduced power state (e.g., power-gated mode). Power management unit 260 can also transition link interface 235 and fabric 240 (or portions thereof) into a reduced power state. By putting components into a reduced power state during idle times or periods of relative inactivity, the power consumption of system 200 can be decreased. However, when a given core 210 and link interface 235 need to be woken up to process pending operations, there will be a latency associated with turning both the given core 210 and link interface 235 back on.

Accordingly, when power management unit 260 detects a condition for waking up a given core of cores 210A-N while link interface 235 is in a non-operational state, power management unit 260 sends an out-of-band signal to processing node 205 over link interface 235 to wake up the given core. In one embodiment, the condition for waking up the given core occurs when interrupt controller 250 receives an interrupt targeting the given core. In other embodiments, the condition for waking up the given core can be based on one or more other events (e.g., a timer expiring, a buffer occupancy reaching a threshold).

In parallel with sending the out-of-band signal to processing node 205, power management unit 260 also sends a signal to power up link interface 235. In one embodiment, the out-of-band signal is sent on the data line(s) 235D of link interface 235. The out-of-band signal can be sent at a relatively low data rate (i.e., lower than the normal data rate used when link interface 235 is in an operational state) and the out-of-band signal can include an encoded message identifying which core(s) to wake up.

Any suitable type of encoding can be used to encode the wake-up message within the out-of-band signal which is sent over the non-operational link interface 235, with the type of encoding varying according to the embodiment. When receiver 230 receives the out-of-band signal, receiver 230 decodes the message embedded in the signal to identify which core(s) to wake up. Then, receiver 230 sends a signal to control unit 215 to wake up the identified core(s). While these events are taking place, link interface 235 is transitioning into an operational state. Depending on the embodiment, link interface 235 transitions into an operational state by locking a phase-locked loop (PLL), performing training on the link, and/or performing one or more actions. By the time the identified core is powered up, link interface 235 will be powered up or link interface 235 will be powered up shortly after. The advantage of performing the wake-up in this parallel manner is that the two previously serial events are now performed at the same time to help reduce the latency of waking up the targeted core(s) and link interface 235.

Once the identified core is powered up and link interface 235 is in an operational state, the core typically restores its state from memory device(s) 275 via link interface 265. It is noted that if link interface 265 is in a non-operational state, power management unit 260 sends a signal to power up link interface 265 in parallel with the signal to power up link interface 235 and the out-of-band signal to the identified core. It is also noted that in addition to memory device(s) 275, the restore state can be stored in cache(s), dedicated SRAM, NVRAM, etc., which is accessed via a link interface to another die or from always-on memory on the local die.

Figure 3:
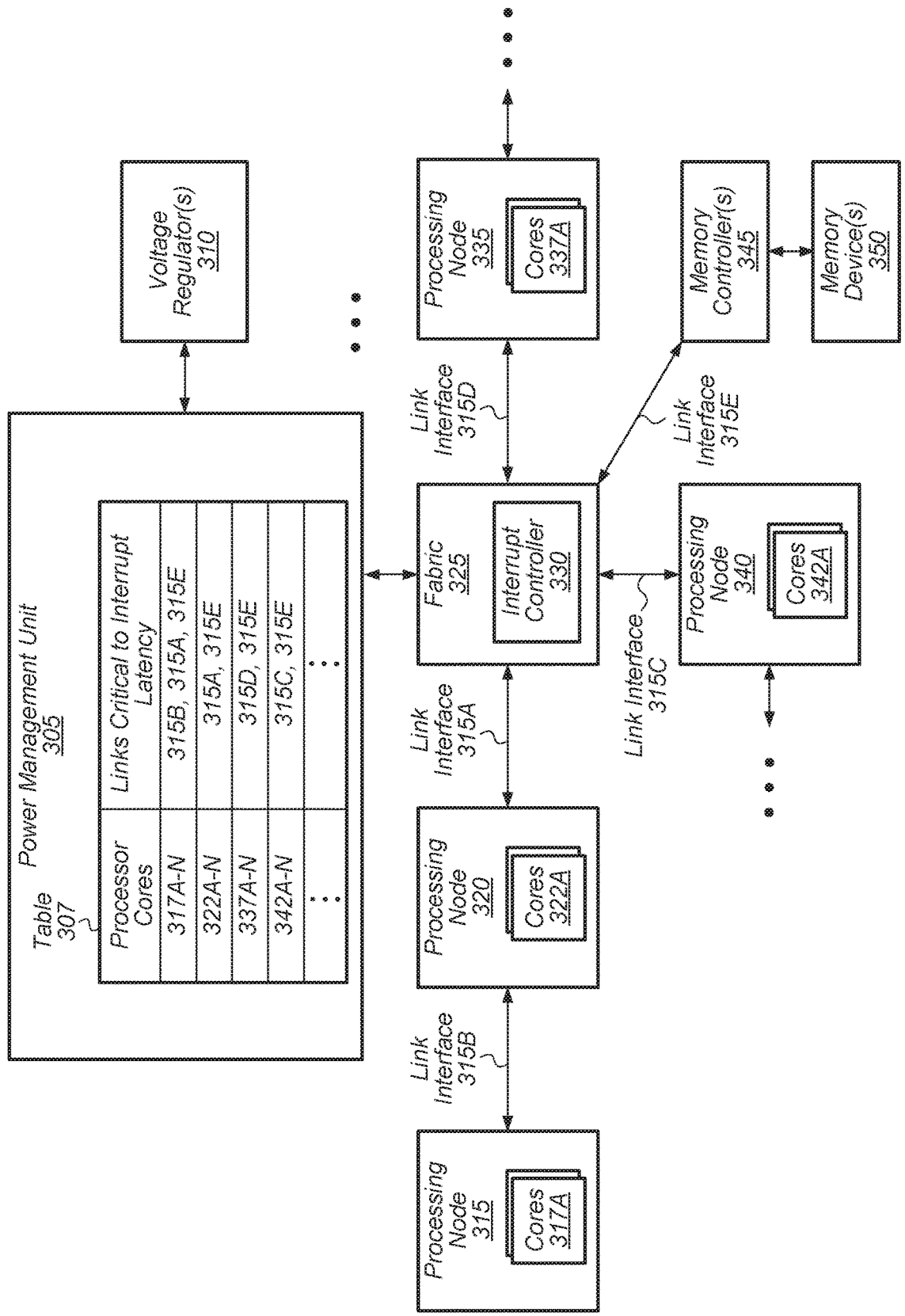
FIG. 3 is a block diagram of another embodiment of a computing system.

Referring now to FIG. 3, a block diagram of another embodiment of a computing system 300 is shown. In one embodiment, computing system 300 includes at least power management unit 305, voltage regulator(s) 310, processing nodes 315, 320, 335, and 340, fabric 325, memory controller(s) 345, and memory device(s) 350. System 300 can also include any number of other components (e.g., I/O interfaces, I/O devices) which are not shown to avoid obscuring the figure. In other embodiments, system 300 can be arranged differently. Also, it should be understood that voltage regulator(s) 310 have connections to supply power to the various components of system 300, although these connections are not shown to avoid obscuring the figure. Further, while the FIG. 3 depicts components are linked to components that are physically adjacent to another, this is for purposes of illustration only. In various embodiments, links may couple components that are adjacent, those that are not adjacent, or both. Numerous such embodiments are possible and are contemplated.

Power management unit 305 manages the power states of the various components and turns off components periodically to reduce power consumption of system 300. While a given component is powered down, various conditions can be detected which would require the given component to be woken up. For example, when interrupt controller 330 detects an interrupt targeting a power-gated core of system 300, interrupt controller 330 generates and sends a corresponding indication to power management unit 305. In some cases, interrupt controller 330 notifies power management unit 305 that multiple components and/or link interfaces need to be powered up.

In one embodiment, power management determines in which order to send out-of-band wake-up signals to various power-gated cores depending on the path to the cores from fabric 325 and depending on which links of link interfaces 315A-E are currently powered up. Additionally, power management unit 305 determines in which order to power up various link interfaces 315A-E while also complying with the power step requirements of voltage regulator(s) 310. In one embodiment, power management unit 305 determines the wake-up order that will result in the lowest latency for pending operations while also complying with the power step requirements of voltage regulator(s) 310. Power management unit 305 can be implemented using any suitable combination of hardware and/or software. It is noted that the term "wake up" can also be referred to as "power on", "increase a power state of", "turn on", or "return to an operational state".

In one embodiment, power management unit 305 includes a table 307 with entries to indicate which link interfaces 315A-E should be woken up for the various processor cores based on how critical these links are to interrupt latency. Table 307 can include any number of entries for the various processor cores of system 300, with the number of entries varying according to the embodiment. In one embodiment, each entry of table 307 includes an identification of a processor core or a group of processor cores on a given processing node and the link interface(s) to power up so as to minimize interrupt latency when waking up a given processor core to process an interrupt. In other embodiments, the entries of table 307 can include other fields and/or be organized in other suitable manners.

In one embodiment, power management unit 305 uses table 307 to determine which link interfaces 315A-E should be powered up to minimize interrupt latency depending on which processor core is targeted by a pending interrupt. Once all of the links in the path of interrupt service have been powered up, the remaining links needed for probe service availability are equally non-critical and can be powered up in any order meeting the platform limit. In some cases there can be multiple cores which are (nearly) simultaneously targeted by interrupts. In these cases, one core's interrupt service path can be favored over another core if the cores are platform limited from performing parallel power-up. The decision of which core to favor can be fixed, round-robin, or based on another factor.

In some embodiments, fabric 325 can have multiple links to multiple memory controllers 345, and fabric 325 can prioritize certain ones of these links depending on which memory device(s) 350 are being accessed. Accordingly, some embodiments can have more than one link to memory device(s) 350. For example, in one embodiment, each processing node of system 300 has its own memory device(s), and each set of these memory device(s) are accessible via a separate link from fabric 325 and a separate memory controller 345.

Figure 4:
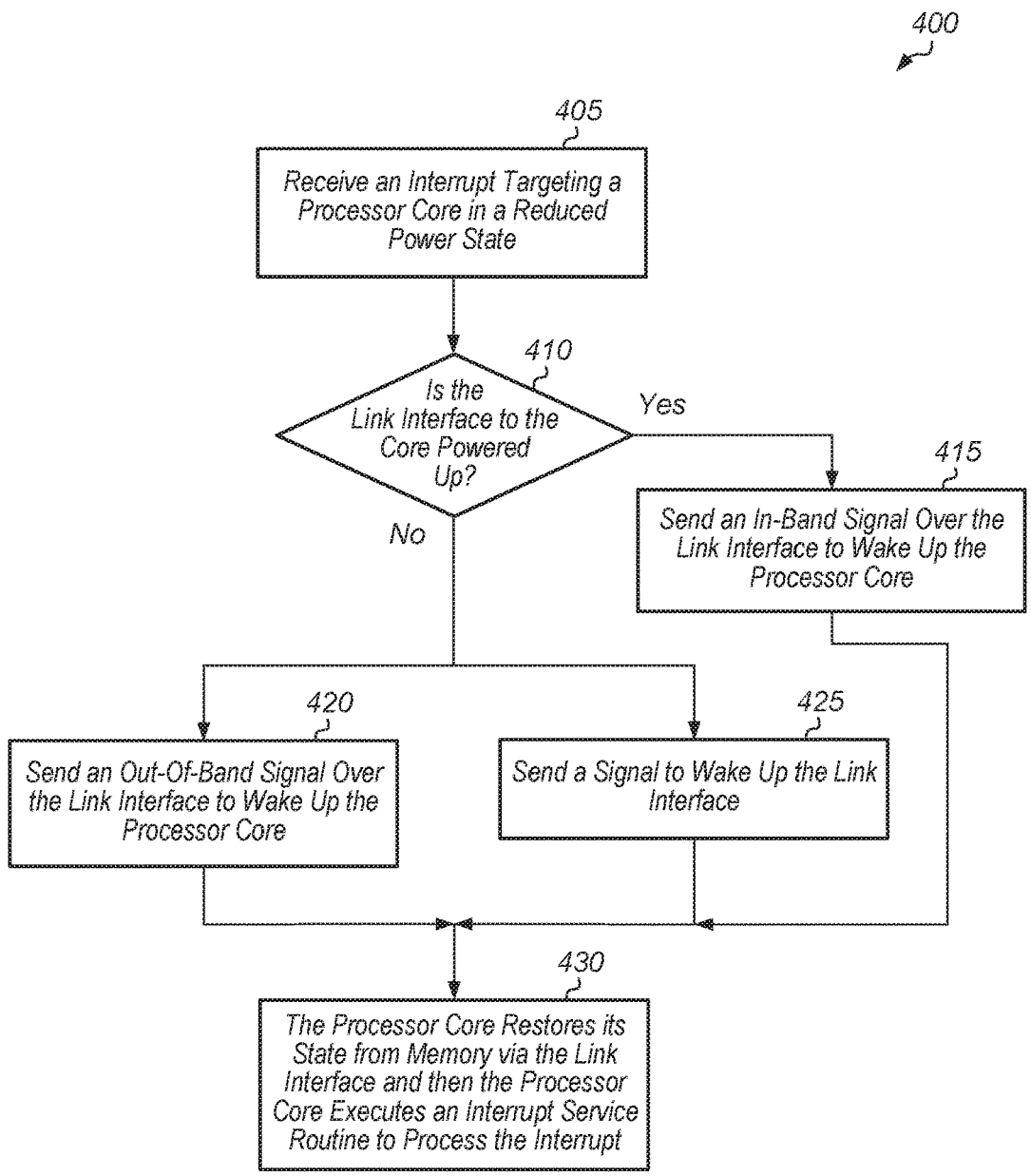
FIG. 4 is a generalized flow diagram illustrating one embodiment of a method for reducing chiplet interrupt latency.
Figure 5:
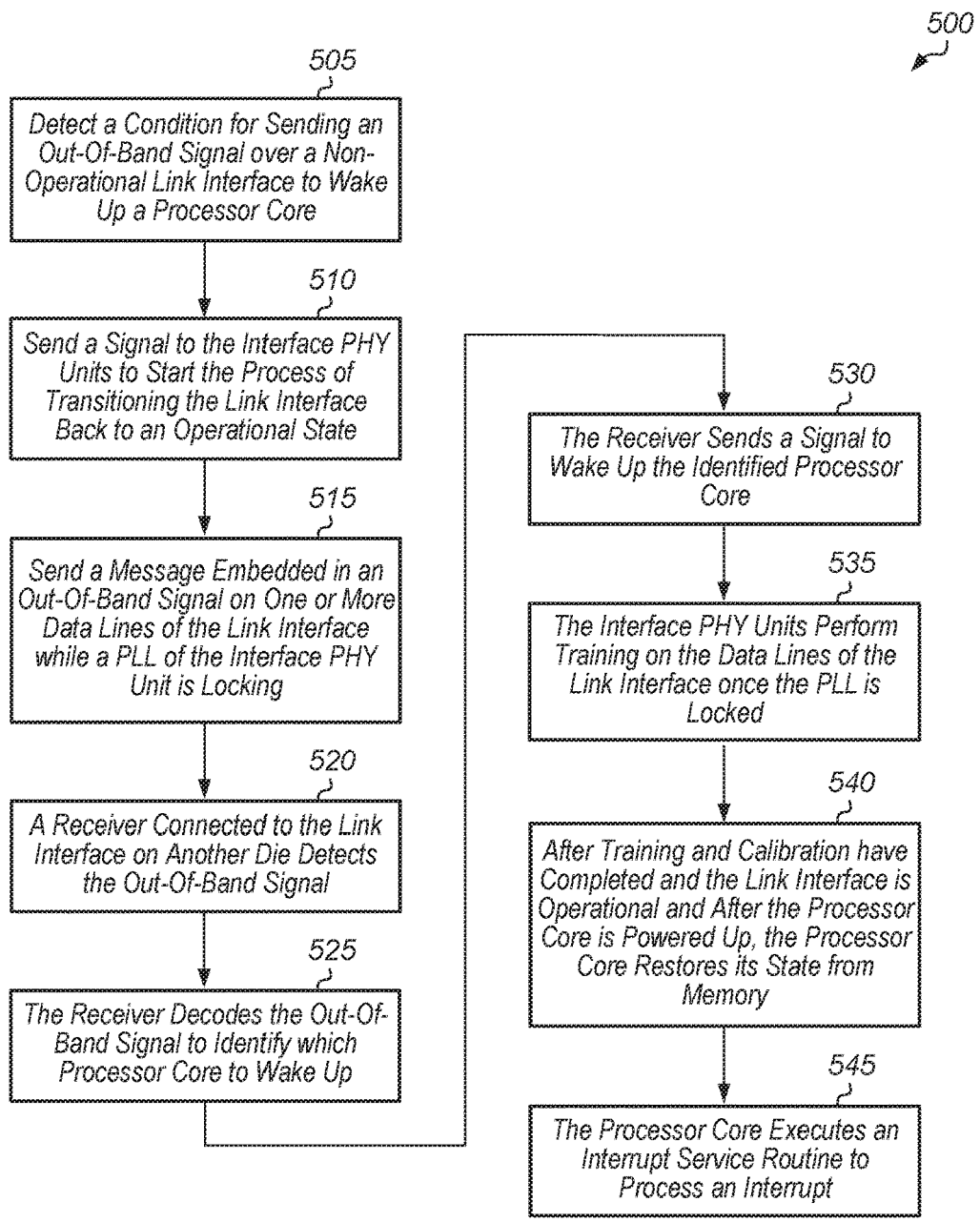
FIG. 5 is a generalized flow diagram illustrating one embodiment of a method for sending an out-of-band signal over a non-operational link interface.
Figure 6:
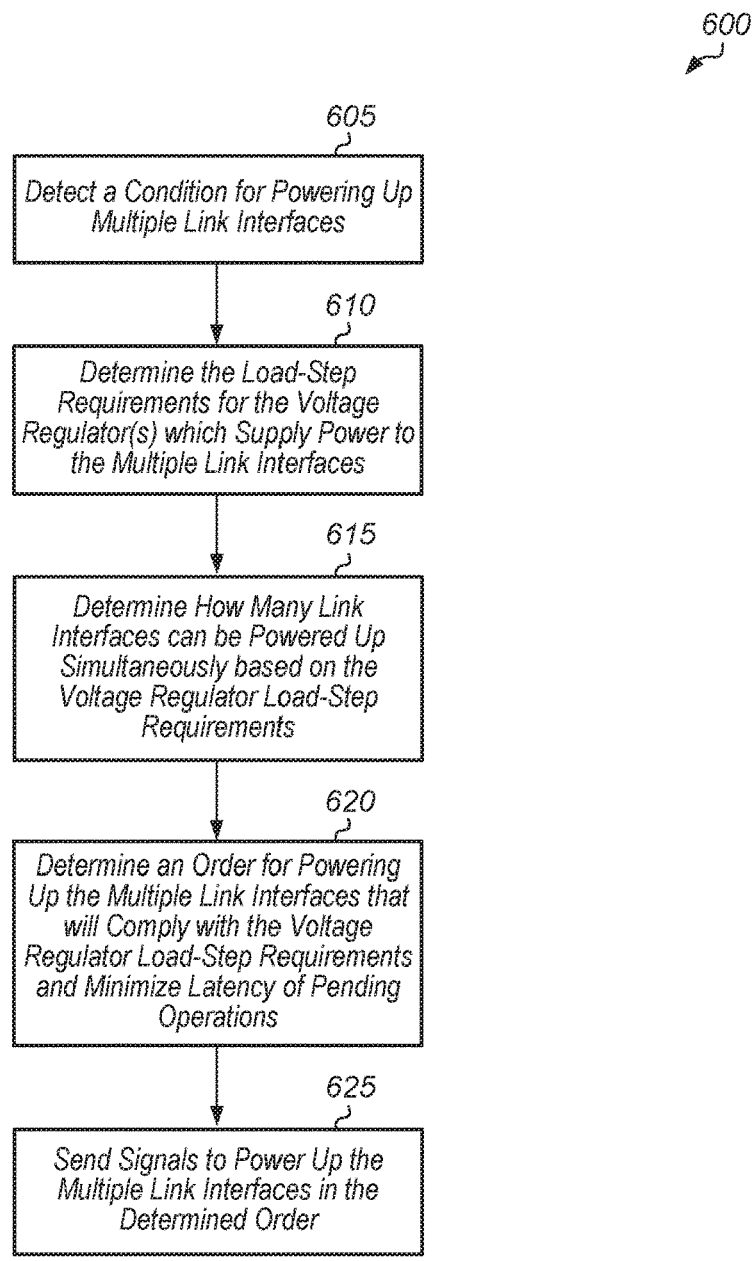
FIG. 6 is a generalized flow diagram illustrating one embodiment of a method for determining an order for powering up multiple link interfaces.

Turning now to FIG. 4, one embodiment of a method 400 for reducing chiplet interrupt latency is shown. For purposes of discussion, the steps in this embodiment and those of FIGS. 5-6 are shown in sequential order. However, it is noted that in various embodiments of the described methods, one or more of the elements described are performed concurrently, in a different order than shown, or are omitted entirely. Other additional elements are also performed as desired. Any of the various systems or apparatuses described herein can implement method 400.

An interrupt controller receives an interrupt targeting a processor core in a reduced power state (block 405). If the link interface to the processor core is powered up (conditional block 410, "yes" leg), then a power management unit coupled to the interrupt controller sends an in-band signal over the link interface to wake up the processor core (block 415). As used herein, the term "in-band signal" is defined as a message sent over a link interface while the link interface is in an operational state. While the power management unit and the interrupt controller can be separate units in one embodiment, in another embodiment, the power management unit and interrupt controller can be integrated together in a single unit. This integrated unit can also be referred to as a control unit. Once the processor core wakes up, the processor core restores its state from memory via the link interface and then the processor core executes an interrupt service routine to process the interrupt (block 430).

If the link interface to the processor core is powered down (conditional block 410, "no" leg), then the power management unit sends an out-of-band signal over the link interface to wake up the processor core (block 420). As used herein, an "out-of-band signal" is defined as a message transmitted over one or more lines of a link interface while the link interface is not in an operational state. The lines of the link interface can also be referred to as pins, wires, or traces. In one embodiment, the message that is sent while the link interface is not in an operational state is sent at a data rate which is less than the operational data rate. This low-data-rate message will be detected by a receiver and decoded to determine which processor core on the processing node to wake up.

In parallel with block 420, the power management unit sends a signal to wake up the link interface (block 425). Once the processor core and link interface have completed the transition to an operational state, the processor core restores its state from memory via the link interface and then the processor core executes an interrupt service routine to process the interrupt (block 430). After block 430, method 400 ends.

Referring now to FIG. 5, one embodiment of a method 500 for sending an out-of-band signal over a non-operational link interface is shown. An interrupt controller detects a condition for sending an out-of-band signal over a non-operational link interface to wake up a processor core (block 505). In one embodiment, the condition can be an interrupt controller receiving an interrupt targeting the processor core. In other embodiments, other conditions for sending an out-of-band signal over a non-operational link interface to wake up a processor core can be detected. It is noted that a "non-operational link interface" can also be referred to as a "powered down link interface" or "powered off link interface".

The power management unit sends a signal to the interface PHY units to start the process of transitioning the link interface back to an operational state (block 510). Also, in parallel with block 510, the power management unit sends a message embedded in an out-of-band signal on one or more data lines of the link interface while a phase-locked loop (PLL) of the interface PHY unit is locking (block 515). Next, a receiver connected to the link interface on another die detects the out-of-band signal (block 520). It is noted that the receiver is connected to an always-on power rail. This receiver can also be referred to as an "always-on receiver".

After block 520, the receiver decodes the out-of-band signal to identify which processor core to wake up (block 525). Next, the receiver sends a signal to wake up the identified processor core (block 530). It is noted that in some embodiments, the out-of-band signal can identify more than one processor core to wake up. While the receiver initiates the wake-up process for the identified processor core, the interface PHY units perform training on the data lines of the link interface once the PLL is locked (block 535). It is noted that while training is performed on the data lines of the link interface, the data lines are unavailable for transmitting data. Therefore, it is preferred that the out-of-band signal be sent prior to the PLL locking and prior to the start of training being performed on the link interface.

Next, after training and calibration have completed and the link interface is operational and after the processor core is powered up, the processor core restores its state from memory (block 540). Then, the processor core executes an interrupt service routine to process an interrupt (block 545).

In other embodiments, the processor can execute other types of routines responsive to returning to an operational state. After block 545, method 500 ends.

Turning now to FIG. 6, one embodiment of a method 600 for determining an order for powering up multiple link interfaces is shown. A power management unit detects a condition for powering up multiple link interfaces (block 605). For example, in one embodiment, a core needs to be woken up to service an interrupt. In this embodiment, the condition can be the need to service probes from the fabric due to DMA or due to subsequent memory requests that will be generated by the waking core. In another embodiment, the condition can be receiving multiple interrupts targeting multiple processor cores (which may or may not be on multiple different dies) that are coupled to a communication fabric via multiple link interfaces. In a further embodiment, the condition can be wake-up timers for multiple components expiring. In a still further embodiment, the condition can be detecting unrelated DMA from I/O devices which requires multiple links to be powered up to service probes while a core receiving an interrupt requires one or more links to be powered up to service the interrupt. In other embodiments, other conditions can be detected.

In response to detecting the condition for powering up multiple link interfaces, the power management unit determines the load-step requirements for the voltage regulator(s) which supply power to the multiple link interfaces (block 610). Then, the power management unit determines how many link interfaces can be powered up simultaneously based on the voltage regulator load-step requirements (block 615). Next, the power management unit determines an order for powering up the multiple link interfaces that will comply with the voltage regulator load-step requirements and minimize latency of pending operations (block 620). For example, in one embodiment, the power management unit includes a table (e.g., table 307 of FIG. 3) which specifies an order in which link interfaces should be woken up to minimize latency of pending operations. In this embodiment, the power management unit can prioritize core wakeup to service an interrupt(s) over probe service availability since system performance is sensitive to core interrupt latency. For example, in one scenario, multiple links might need to be powered up, such as a processing node of an interrupted core plus all other processing nodes that have caching enabled. In this scenario, the interrupted core's link to memory can be powered up so that the core can service the interrupt, and then the remaining processing nodes that need to service probes to their caches can be powered up in case probes are generated by the interrupted core's requests or by unrelated traffic. In other embodiments, the power management unit can use other suitable techniques and mechanisms to determine the order for waking up the multiple link interfaces. Then, the power management unit sends signals to power up the multiple link interfaces in the determined order (block 625). After block 625, method 600 ends.

In various embodiments, program instructions of a software application are used to implement the methods and/or mechanisms described herein. For example, program instructions executable by a general or special purpose processor are contemplated. In various embodiments, such program instructions can be represented by a high level programming language. In other embodiments, the program instructions can be compiled from a high level programming language to a binary, intermediate, or other form. Alternatively, program instructions can be written that describe the behavior or design of hardware. Such program instructions can be represented by a high-level programming language, such as C. Alternatively, a hardware design language (HDL) such as Verilog can be used. In various embodiments, the program instructions are stored on any of a variety of non-transitory computer readable storage mediums. The storage medium is accessible by a computing system during use to provide the program instructions to the computing system for program execution. Generally speaking, such a computing system includes at least one or more memories and one or more processors that can execute program instructions.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A system comprising:
one or more processing nodes, wherein each processing node of the one or more processing nodes comprises one or more processor cores;
a communication fabric coupled to the one or more processing nodes via one or more link interfaces; and
a power management unit;
wherein the power management unit is configured to:
detect a request to wake up a processor core of a processing node;
determine that a link interface that connects the communication fabric to the processing node is in a non-operational state; and
send an out-of-band signal over the link interface to wake up the processor core prior to the link interface returning to an operational state.

2. The system as recited in claim 1, wherein the power management unit is further configured to send a signal to power up the link interface in parallel with sending the out-of-band signal over the link interface to wake up the processor core.

3. The system as recited in claim 1, wherein:
the processing node is on a first semiconductor die;
the communication fabric is on a second semiconductor die; and
the second semiconductor die is different from the first semiconductor die.

4. The system as recited in claim 1, wherein the out-of-band signal to wake up the processor core is sent on the link interface prior to training being performed on the link interface.

5. The system as recited in claim 1, wherein the power management unit is further configured to:
detect a condition for powering up multiple link interfaces; and
determine an order for powering up the multiple link interfaces based on complying with voltage regulator load-step requirements and minimizing a latency of pending operations.

6. The system as recited in claim 5, wherein:
the power management unit is further configured to maintain a table with entries for a plurality of components; and
each entry specifies an order of powering up link interfaces to minimize the latency of pending operations for a corresponding component.

7. A method comprising:
- detecting, by a power management unit comprising circuitry, a request to wake up a processor core of a processing node;
- determining, by the power management unit, that a link interface is in a non-operational state, wherein the link interface connects a communication fabric to the processing node; and
- sending, by the power management unit, an out-of-band signal over the link interface to wake up the processor core prior to the link interface returning to an operational state.

8. The method as recited in claim 7, further comprising sending a signal to power up the link interface in parallel with sending the out-of-band signal over the link interface to wake up the processor core.

9. The method as recited in claim 7, wherein the processing node is on a first semiconductor die, wherein the communication fabric is on a second semiconductor die, and wherein the second semiconductor die is different from the first semiconductor die.

10. The method as recited in claim 7, wherein the out-of-band signal to wake up the processor core is sent on the link interface prior to training being performed on the link interface.

11. The method as recited in claim 7, further comprising:
- detecting a condition for powering up multiple link interfaces; and
- determining an order for powering up the multiple link interfaces based on complying with voltage regulator load-step requirements and minimizing a latency of pending operations.

12. The method as recited in claim 11, further comprising maintaining a table with entries for a plurality of components, wherein each entry specifies an order of powering up link interfaces to minimize the latency of pending operations for a corresponding component.

13. An apparatus comprising:
- a processing node comprising a plurality of processor cores; and
- a control unit;
- wherein the control unit is configured to:
  - detect a request to wake up a processor core of the processing node;
  - determine that a link interface is in a non-operational state, wherein the link interface connects the control unit to the processing node; and
  - send an out-of-band signal over the link interface to wake up the processor core prior to the link interface returning to an operational state.

14. The apparatus as recited in claim 13, wherein the control unit is further configured to send a signal to power up the link interface in parallel with sending the out-of-band signal over the link interface to wake up the processor core.

15. The apparatus as recited in claim 13, wherein the processing node is on a first semiconductor die, wherein the control unit is on a second semiconductor die, and wherein the second semiconductor die is different from the first semiconductor die.

16. The apparatus as recited in claim 13, wherein the out-of-band signal to wake up the processor core is sent on the link interface prior to training being performed on the link interface.

17. The apparatus as recited in claim 13, wherein the control unit is further configured to determine an order for powering up multiple link interfaces based on complying with voltage regulator load-step requirements and minimizing a latency of pending operations.

* * * * *